US012638376B2

(12) United States Patent
Meng et al.

(10) Patent No.: US 12,638,376 B2
(45) Date of Patent: May 26, 2026

(54) CELLULAR MECHANICAL PROPERTY MEASUREMENT AND SORTING SYSTEM, METHOD, AND TERMINAL

(71) Applicant: SHENZHEN INSTITUTES OF ADVANCED TECHNOLOGY CHINESE ACADEMY OF SCIENCES, Shenzhen (CN)

(72) Inventors: Long Meng, Shenzhen (CN); Wei Zhou, Shenzhen (CN); Hairong Zheng, Shenzhen (CN); Lili Niu, Shenzhen (CN); Benxian Peng, Shenzhen (CN)

(73) Assignee: SHENZHEN INSTITUTES OF ADVANCED TECHNOLOGY CHINESE ACADEMY OF SCIENCES, Shenzhen (CN)

( * ) Notice: Subject to any disclaimer, the term of this patent is extended or adjusted under 35 U.S.C. 154(b) by 0 days.

(21) Appl. No.: 19/004,464

(22) Filed: Dec. 30, 2024

(65) Prior Publication Data

US 2025/0137909 A1     May 1, 2025

Related U.S. Application Data

(63) Continuation of application No. PCT/CN2022/123288, filed on Sep. 30, 2022.

(51) Int. Cl.
　G01N 15/149　　(2024.01)
　G01N 15/10　　(2024.01)
　(Continued)

(52) U.S. Cl.
　CPC ....... G01N 15/149 (2024.01); G01N 15/1404 (2013.01); G01N 15/1456 (2013.01);
　(Continued)

(58) Field of Classification Search
　CPC .... B07C 5/34; G01N 15/0227; G01N 15/149; G01N 2015/1006; G01N 2015/142; G01N 2015/1495
　(Continued)

(56) References Cited

U.S. PATENT DOCUMENTS

2015/0017678 A1　1/2015　Matula et al.

FOREIGN PATENT DOCUMENTS

CN　　107475114 A　12/2017
CN　　109540771 A　3/2019
　(Continued)

OTHER PUBLICATIONS

Zheng; Hairong, "Biological Sample Sorting Method, Surface Acoustic Wave Micro-Fluidic Chip, System, Terminal and Storage Medium" (English Translation), Nov. 13, 2020, worldwide.espacenet.com (Year: 2020).*

(Continued)

*Primary Examiner* — Molly K Devine

(57)　　　ABSTRACT

A cellular mechanical property measurement and sorting method comprises: cells to be sorted being arranged in a straight line after passing through a standing wave acoustic field generated by a first interdigital transducer; the cells flowing through a focused acoustic field generated by a second interdigital transducer, and the focused acoustic field generating a radiation force on the cells, such that the cells are deformed; performing calculation according to information of the radiation force and deformation, so as to obtain elastic moduli of the cells; determining the positions of the cells, and selectively driving, with designed delay time, interdigital transducers in a cell sorting unit according to the moving speeds of the cells and the distances between the cells and the sorting unit, and triggering, according to the (Continued)

elastic moduli, a corresponding interdigital transducer to generate a planar acoustic field, so as to sort the cells.

9 Claims, 5 Drawing Sheets

(51) Int. Cl.
  *G01N 15/14* (2024.01)
  *G01N 15/1404* (2024.01)
(52) U.S. Cl.
  CPC ................ *G01N 2015/1006* (2013.01); *G01N 2015/142* (2013.01); *G01N 2015/1495* (2013.01)
(58) Field of Classification Search
  USPC ............................................ 209/2, 590, 599
  See application file for complete search history.

(56) References Cited

FOREIGN PATENT DOCUMENTS

| | | | |
|---|---|---|---|
| CN | 109827890 A | 5/2019 | |
| CN | 111925934 A * | 11/2020 | ............ C12M 23/16 |
| CN | 114441412 A | 5/2022 | |
| WO | WO-2021103579 A1 * | 6/2021 | .............. H03H 3/02 |

OTHER PUBLICATIONS

Wang; Haibin, "Device and Method for Testing Mechanical Properties of Biological Cells by Using Acoustic Radiation Force" (English Translation), May 6, 2022, worldwide.espacenet.com (Year: 2022).*

Yang; Yi, "Acoustic-Optic Microfluidic Chip for Accurately Sorting Leukocyte Subtype and Sorting Method Therefor" (English Translation), Mar. 29, 2019, worldwide.espacenet.com (Year: 2019).*

Pan; Feng, "Thin Film Material Surface Acoustic Wave Device with GS Layered Electrode, Preparation Method Therefor and Use Thereof" (English Translation), Jun. 3, 2021, worldwide.espacenet. com (Year: 2021).*

Kroetch; Aruna, "NanoFab's PDMS Microfluidic Device Fabrication Manual", Sep. 2004, nanoqam.ca (Year: 2004).*

International Search Report issued in corresponding International application No. PCT/CN2022/123288, mailed Jun. 2, 2023 (5 pages).

Written Opinion of the International Search Authority in corresponding International application No. PCT/CN2022/123288, mailed Jun. 2, 2023 (5 pages).

* cited by examiner

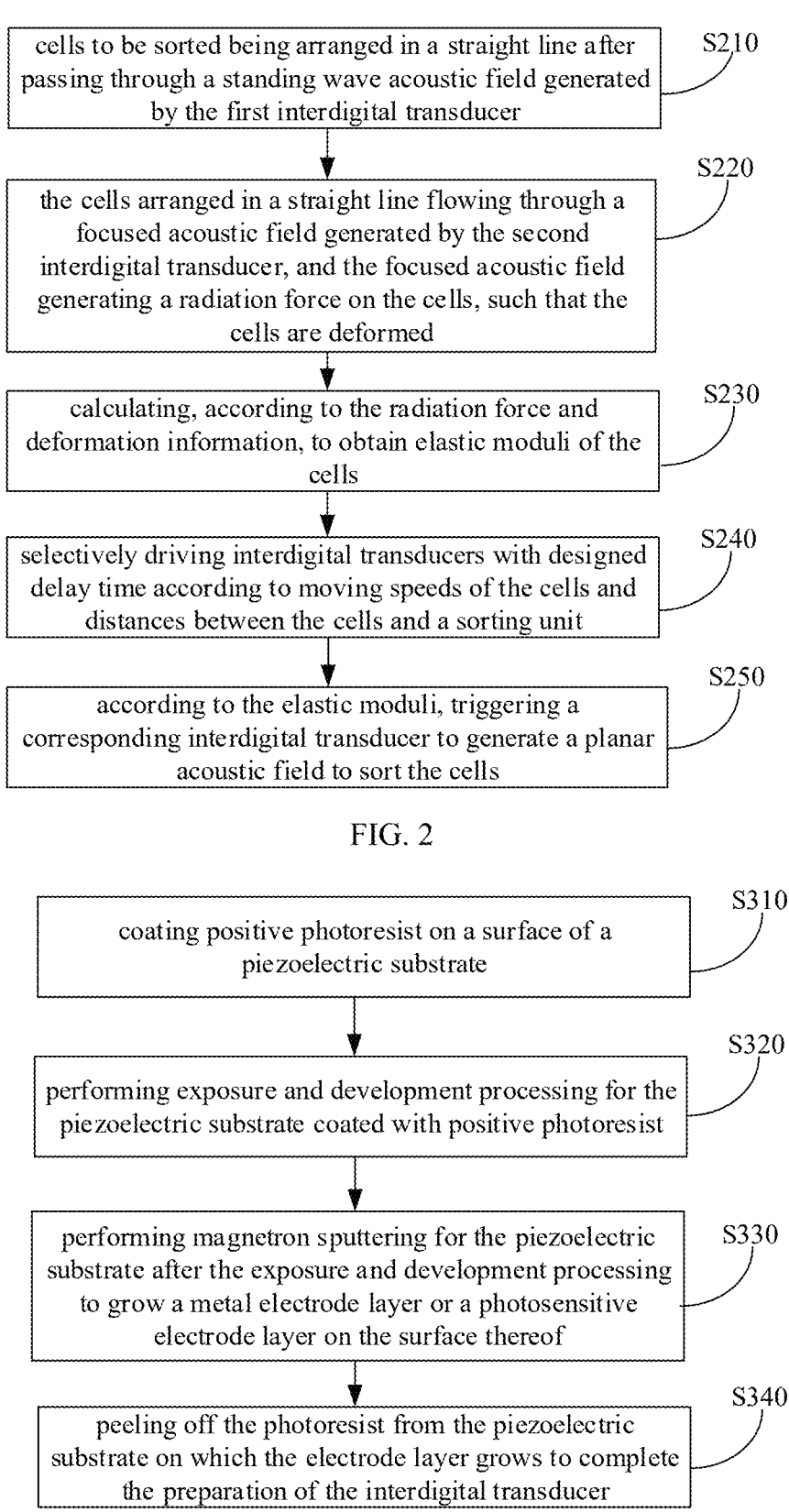

cells to be sorted being arranged in a straight line after passing through a standing wave acoustic field generated by the first interdigital transducer — S210 the cells arranged in a straight line flowing through a focused acoustic field generated by the second interdigital transducer, and the focused acoustic field generating a radiation force on the cells, such that the cells are deformed — S220 calculating, according to the radiation force and deformation information, to obtain elastic moduli of the cells — S230 selectively driving interdigital transducers with designed delay time according to moving speeds of the cells and distances between the cells and a sorting unit — S240 according to the elastic moduli, triggering a corresponding interdigital transducer to generate a planar acoustic field to sort the cells — S250

FIG. 2 coating positive photoresist on a surface of a piezoelectric substrate — S310 performing exposure and development processing for the piezoelectric substrate coated with positive photoresist — S320 performing magnetron sputtering for the piezoelectric substrate after the exposure and development processing to grow a metal electrode layer or a photosensitive electrode layer on the surface thereof — S330 peeling off the photoresist from the piezoelectric substrate on which the electrode layer grows to complete the preparation of the interdigital transducer — S340

FIG. 3

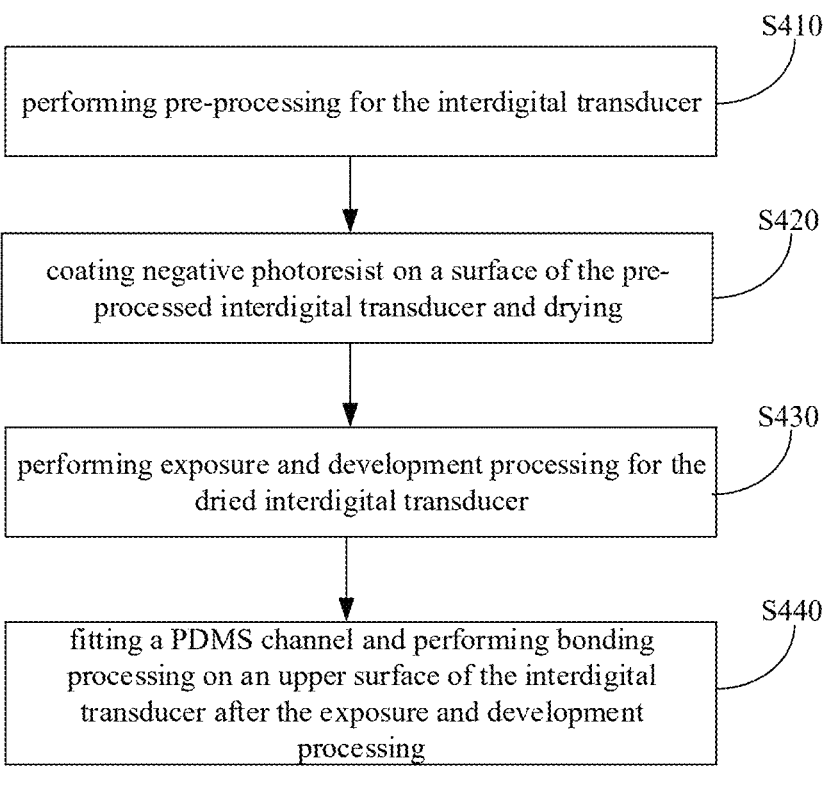

S410 performing pre-processing for the interdigital transducer

S420 coating negative photoresist on a surface of the pre-processed interdigital transducer and drying

S430 performing exposure and development processing for the dried interdigital transducer

S440 fitting a PDMS channel and performing bonding processing on an upper surface of the interdigital transducer after the exposure and development processing

FIG. 5

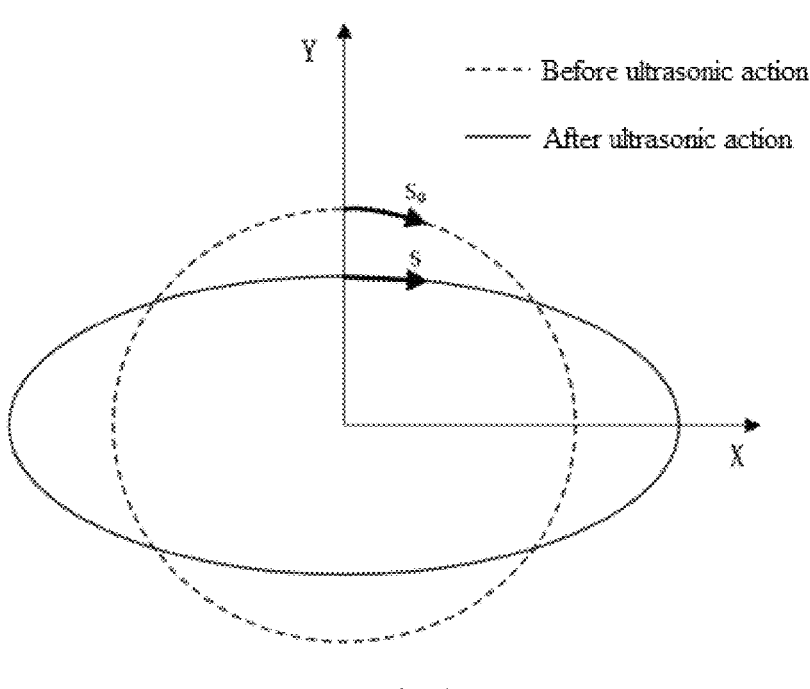

- - - - Before ultrasonic action

——— After ultrasonic action

FIG. 6

CELLULAR MECHANICAL PROPERTY MEASUREMENT AND SORTING SYSTEM, METHOD, AND TERMINAL

CROSS-REFERENCE TO RELATED APPLICATIONS

This application is a U.S. continuation of co-pending International Patent Application Number PCT/CN2022/123288, filed on Sep. 30, 2022, with China National Intellectual Property Administration, the disclosure of which is incorporated herein by reference in its entirety.

TECHNICAL FIELD

The present application relates to neural regulation technology, and particularly relates to a cellular mechanical property measurement and sorting system, method, and terminal.

BACKGROUND

Study of impact of cellular mechanical properties on cellular biological functions fully demonstrates important influence of mechanical factors. Due to such significant impact of cellular mechanical properties on cellular biological functions, it is crucial to accurately measure mechanical properties of cells, whether it is for using mechanical properties of cells to better understand their biological functions or using external stimulations to alter their mechanical properties and thereby alter their biological functions. Cellular mechanics has been proven to be a kind of biophysical fingerprint that can distinguish cell phenotypes, reveal processes of aging or disease, and even detect and diagnose cellular lesions. For example, elastic modulus of a healthy breast cell is more than 2 times that of a breast cancer cell, and elastic modulus of a benign breast tumor cells is 1.4-1.8 times that of a malignant breast cancer cell. Decrease in cellular elastic modulus can be used for cancer diagnosis. Low viscoelasticity and poor deformability of red blood cells indicate cellular aging and pathology. Based on viscoelasticity and deformability of red blood cells, diseased and aging cells can be distinguished from healthy and young red blood cells, which requires high accuracy in measuring elastic modulus of cells. It can be seen that Young's modulus of cells serves as an inherent mechanical parameter of cells.

Existing methods, such as atomic force microscopy, microtubule suction, technology of magnetic tweezers, etc., have low flux and require labeling, which limits their application in cellular mechanics measurement. Technology of acoustic tweezers utilizes effects such as reflection, refraction, absorption, and the like to sound waves, which are generated by objects in a sound field, to cause exchange of momentum between the sound waves and the objects, thereby generating action of force, that is, acoustic radiation force. Since acoustic tweezers have characteristics of label free, non-contact, high-throughput, universal applicability, etc., they have significant application prospects in evaluation of egg cell viability.

Existing methods, such as atomic force microscopy, microtubule suction, technology of magnetic tweezers, etc., have low flux and require labeling, which limits their application in cellular mechanics measurement.

SUMMARY OF THE DISCLOSURE

In view of this, aiming at the defect existing in the prior art, it is necessary to provide a sorting system and a sorting method that use ultrasonic and non-contact measurement for cellular elasticity and can realize sorting for cells having different elastic moduli.

In order to solve the above problem, the present application adopts the following technical solutions.

A first purpose of the present application provides a cellular mechanical property measurement and sorting system comprising a first interdigital transducer, a second interdigital transducer, a cellular elastic modulus calculation unit, a cell locating unit, and a cell sorting unit; wherein cells to be sorted are arranged in a straight line after passing through a standing wave acoustic field generated by the first interdigital transducer; the cells arranged in a straight line flows through a focused acoustic field generated by the second interdigital transducer, and the focused acoustic field generates a radiation force on the cells, such that the cells are deformed; the cellular elastic modulus calculation unit calculates, according to the radiation force and deformation information, to obtain elastic moduli of the cells; the cell locating unit is used to determine positions of the cells, and the cell locating unit is further used to selectively drive interdigital transducers in the cell sorting unit with designed delay time according to moving speeds of the cells and distances between the cells and the sorting unit; the cell sorting unit triggers, according to the elastic moduli, a corresponding interdigital transducer to generate a planar acoustic field to sort the cells.

In some embodiments thereof, the cellular elastic modulus calculation unit comprises a recording module and a computer, the recording module comprises a high-speed camera or a microscope, deformation generated by the cells is recorded by the recording module, the computer calculates to obtain elastic moduli of the cells based on the radiation force and the deformation information.

In some embodiments thereof, the cell locating unit comprises a photosensitive electrode.

In some embodiments thereof, the cell sorting unit comprises an array of interdigital transducers.

A second purpose of the present application provides a cellular mechanical property measurement and sorting method comprising the following steps: cells to be sorted being arranged in a straight line after passing through a standing wave acoustic field generated by a first interdigital transducer; the cells arranged in a straight line flowing through a focused acoustic field generated by a second interdigital transducer, and the focused acoustic field generating a radiation force on the cells, such that the cells are deformed; calculating, according to the radiation force and deformation information, to obtain elastic moduli of the cells; selectively driving interdigital transducers with designed delay time according to moving speeds of the cells and distances between the cells and a sorting unit; according to the elastic moduli, triggering a corresponding interdigital transducer to generate a planar acoustic field to sort the cells.

In some embodiments thereof, the interdigital transducer comprises the following preparing method: preparing an interdigital transducer and forming a PDMS channel on the interdigital transducer.

In some embodiments thereof, in the step of preparing an interdigital transducer, the following steps are specifically included: coating positive photoresist on a surface of a piezoelectric substrate; performing exposure and development processing for the piezoelectric substrate coated with positive photoresist; performing magnetron sputtering for the piezoelectric substrate after the exposure and development processing to grow a metal electrode layer or a photosensitive electrode layer on the surface thereof; peeling off the photoresist from the piezoelectric substrate on which the electrode layer grows to complete the preparation of the interdigital transducer.

In some embodiments thereof, in the step of forming a PDMS channel on the interdigital transducer, the following steps are specifically included: performing pre-processing for the interdigital transducer; coating negative photoresist on a surface of the pre-processed interdigital transducer and drying; performing exposure and development processing for the dried interdigital transducer; fitting a PDMS channel and performing bonding processing on an upper surface of the interdigital transducer after the exposure and development processing.

In some embodiments thereof, the PDMS channel is obtained by preparation using the following method: injecting PDMS into a mold, vacuuming to remove bubbles from the PDMS, and then heating to solidify the PDMS; peeling off the PDMS from a channel of the mold to obtain the PDMS channel.

In some embodiments thereof, in the step of the cells arranged in a straight line flowing through a focused acoustic field generated by a second interdigital transducer, and the focused acoustic field generating a radiation force on the cells, such that the cells are deformed, deformation generated by the cells is recorded by a high-speed camera or a microscope.

In some embodiments thereof, in the step of calculating, according to the radiation force and deformation information, to obtain elastic moduli of the cells, the following steps are specifically included: obtaining information of deformation of the cells; performing simulation for the ultrasound radiation force exerted on the cells; realizing characterization of elastic moduli of the cells based on a simulation result.

A third purpose of the present application provides a terminal, the terminal comprises a processor and a memory coupled with the processor, wherein the memory stores program instructions configured to implement the cellular mechanical property measurement and sorting method, the processor is configured to execute the program instructions stored in the memory to control cell sorting.

A fourth purpose of the present application provides a storage medium storing program instructions being executable by a processor, the program instructions are configured to execute the cellular mechanical property measurement and sorting method.

The present application adopts above technical solutions, of which advantageous effect is as follows.

In the cellular mechanical property measurement and sorting system, method, terminal, and storage medium provided by the present application, cells to be sorted are arranged in a straight line after passing through a standing wave acoustic field generated by a first interdigital transducer; the cells arranged in a straight line flows through a focused acoustic field generated by a second interdigital transducer, and the focused acoustic field generates a radiation force on the cells, such that the cells are deformed; a cellular elastic modulus calculation unit calculates, according to the radiation force and deformation information, to obtain elastic moduli of the cells; a cell sorting unit triggers, according to the elastic moduli, a corresponding interdigital transducer to generate a planar acoustic field to sort the cells. The cellular mechanical property measurement and sorting system, method, terminal, and storage medium provided by the present application realizes measurement and sorting for cellular elasticity by means of an ultrasound and non-contact manner, thereby reducing damage to cells.

BRIEF DESCRIPTION OF THE DRAWINGS

In order to explain technical solutions of embodiments of the present application more clearly, drawings required to be used in description of the embodiments of the present application or of the prior art will be briefly introduced below. It is obvious that the drawings in the following description are only some embodiments of the present application. For one of ordinary skill in the art, other drawings can be further obtained according to these drawings on the premise of paying no creative work.

FIG. 2 is a flow chart of steps of a cellular mechanical property measurement and sorting method provided by an embodiment 2 of the present application.

FIG. 3 is a flow chart of steps of preparing an interdigital transducer provided by the embodiment 2 of the present application.

FIG. 5 is a flow chart of steps of forming a PDMS channel on an interdigital transducer provided by the embodiment 2 of the present application.

FIG. 6 is a schematic view of a cell that is compressed from a spherical shape to an ellipsoidal shape under action of an ultrasonic radiation force generated in a standing wave acoustic field provided by the embodiment 2 of the present application.

DETAILED DESCRIPTION

Embodiments of the present application are described in detail below. Examples of the embodiments are shown in the accompanying drawings, wherein the same or similar reference numbers throughout represent the same or similar components or components with the same or similar functions. The embodiments described below with reference to the accompanying drawings are exemplary and intended to explain the present application, but cannot be understood as limiting the present application.

In the description of the present application, it should be understood that the orientations or position relationships indicated by the terms "up", "down", "horizontal", "inside", "outside", and the like are orientations or position relationships based on shown in the accompany drawings, and are only for the convenience of describing the present application and simplifying the description, rather than indicating or implying that the device or element referred to must have a specific orientation, or be constructed and operated in a specific orientation. Therefore, they cannot be understood as any limitation to the present application.

In addition, the terms "first" and "second" are only used for the purpose of description, and cannot be understood as indicating or implying relative importance or implying the quantity of technical features indicated. Therefore, features limited by "first" and "second" can explicitly or implicitly include one or more of these features. In the description of the present application, "multiple" means two or more, unless otherwise specified.

In order to make the purposes, technical solutions, and advantages of the present application be clearer and more understandable, the present application is further illustrated in detail below in combination with the accompany drawings and embodiments.

Embodiment 1

Figure 1:
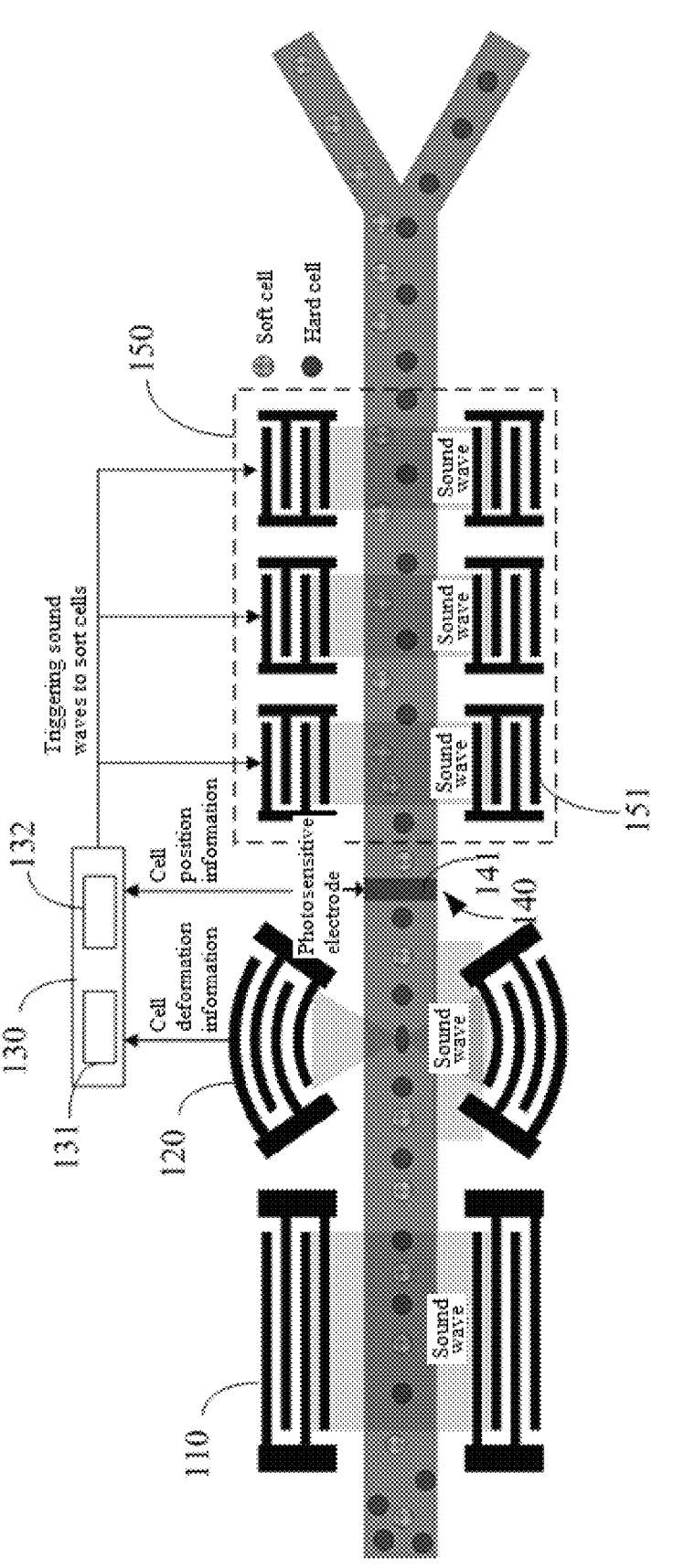
FIG. 1 is a structural schematic diagram of a cellular mechanical property measurement and sorting system provided by an embodiment 1 of the present application.

Referring to FIG. 1, which is a structural schematic diagram of a cellular mechanical property measurement and sorting system provided by an embodiment 1 of the present application, the system includes a first interdigital transducer 110, a second interdigital transducer 120, a cellular elastic modulus calculation unit 130, a cell locating unit 140, and a cell sorting unit 150.

It should be noted that the interdigital transducers provided in the embodiment of the present application are formed by plating interdigital electrodes on piezoelectric substrates. When sine wave signals in corresponding frequencies are input, surface wave signals in the corresponding frequency can be generated. Due to characteristics of high frequency, miniaturization, and low energy loss, they can be applied to manipulation for microscopic particles or cells. At the same time, it is possible to regulate a surface wave sound field by regulating a shape of an interdigital transducer, thereby achieving generation of a focused or planar sound field. By focusing a sound field to deform cells, mechanical properties of the cells are measured, and planar sound fields are selectively triggered by mechanical property measurement structures for sorting cells.

The cellular mechanical property measurement and sorting system provided by the present application has the following work method.

Step S110: cells to be sorted are arranged in a straight line after passing through a standing wave acoustic field generated by the first interdigital transducer 110. It can be understood that a surface wave sound field is regulated by regulating the shape of the first interdigital transducer 110, and a standing wave sound field generated makes the passing cells to be sorted be arranged in a straight line.

Step 120, the cells arranged in a straight line flows through a focused acoustic field generated by the second interdigital transducer 120, and the focused acoustic field generates a radiation force on the cells, such that the cells are deformed. It can be understood that a surface wave sound field is regulated by regulating the shape of the second interdigital transducer 120, the high-intensity focused sound field generated by the second interdigital transducer 120 will exert a radiation force on the cells, thereby achieving compression on the cells and generating deformation.

Step S130: the cellular elastic modulus calculation unit 130 calculates, according to the radiation force and deformation information, to obtain elastic moduli of the cells.

In some embodiments thereof, the cellular elastic modulus calculation unit 130 includes a recording module 131 and a computer 132, the recording module 131 includes a high-speed camera or a microscope, deformation generated by the cells is recorded by the recording module 131, the computer 132 calculates to obtain elastic moduli of the cells based on the radiation force and the deformation information.

Step S140: the cell locating unit 140 can determine positions of the cells, and selectively drive third interdigital transducers 151 in the cell sorting unit 150 (described below) with designed delay time according to moving speeds of the cells and distances between the cells and the sorting unit.

In some embodiments thereof, the cell locating unit 140 includes a photosensitive electrode 141.

Step S150: the cell sorting unit 150 triggers, according to the elastic moduli, a corresponding third interdigital transducer 151 to generate a planar acoustic field to sort the cells.

In some embodiments thereof, the cell sorting unit 150 includes an array of third interdigital transducers 151.

It can be understood that when it is necessary to sort out soft cells, the cell elastic modulus calculation unit 130 calculates, according to the radiation force and the deformation information, to obtain the elastic moduli of the cells. The cell sorting unit 150 triggers, according to the elastic moduli, a planar ultrasonic transducer, such as the third interdigital transducer 151, to generate sound waves, and a radiation force generated by the sound waves will push the soft cells towards an upper end of a channel; on the contrary, when hard cells flow through, the cell sorting unit 150, according to the elastic moduli, will not trigger the corresponding third interdigital transducer 151, and the hard cells still flow in the original direction, thereby achieving cell sorting based on cell elasticity.

The cellular mechanical property measurement and sorting system provided by the present application realizes measurement and sorting for cellular elasticity by means of an ultrasound and non-contact manner, thereby reducing damage to cells.

Embodiment 2

Referring to FIG. 2, which is a flow chart of steps of a cellular mechanical property measurement and sorting method provided by an embodiment 2 of the present application. The method can be implemented by the aforementioned cellular mechanical property measurement and sorting system provided by the embodiment 1 of the present application, and includes the followings steps S210-S250. Implementation manners of each step is described in detail below.

Step S210: cells to be sorted being arranged in a straight line after passing through a standing wave acoustic field generated by a first interdigital transducer 110.

It should be noted that preparation of the interdigital transducers provided by the present application (e.g., the aforesaid first interdigital transducer 110, second interdigital transducer 120, and third interdigital transducer 151) is mainly made by plating interdigital electrodes and recording electrodes on a piezoelectric substrate. In order to obtain a larger electromechanical coupling coefficient, lithium niobate with 128° YX or X-cut double-sided polishing is selected as the piezoelectric substrate. A process of making the interdigital transducer mainly includes processes such as glue applying, photolithography, film coating, peeling, etc. A specific preparation method includes preparing an interdigital transducer and forming a PDMS (polydimethylsiloxane) channel on the interdigital transducer.

Referring to FIG. 3, in the step of preparing an interdigital transducer, such as preparing any one of the first interdigital transducer 110, the second interdigital transducer 120, and the third interdigital transducer 151, the following steps S310-S340 are specifically included. Implementation manner of each step is described in detail below.

Step S310: coating positive photoresist on a surface of a piezoelectric substrate.

Specifically, on a surface of a piezoelectric substrate that has been thoroughly cleaned, positive photoresist AZ5214 is spin-coated at 3000 rpm for 30 seconds, and then the piezoelectric substrate is placed on a heating plate at 65° C.

and baked for 3 minutes. A step gauge is used to test a thickness of the photoresist, the thickness of the photoresist is approximately 1.5 μm, as shown in (a) of FIG. 4.

S320, performing exposure and development processing for the piezoelectric substrate coated with positive photoresist.

Figure 4:
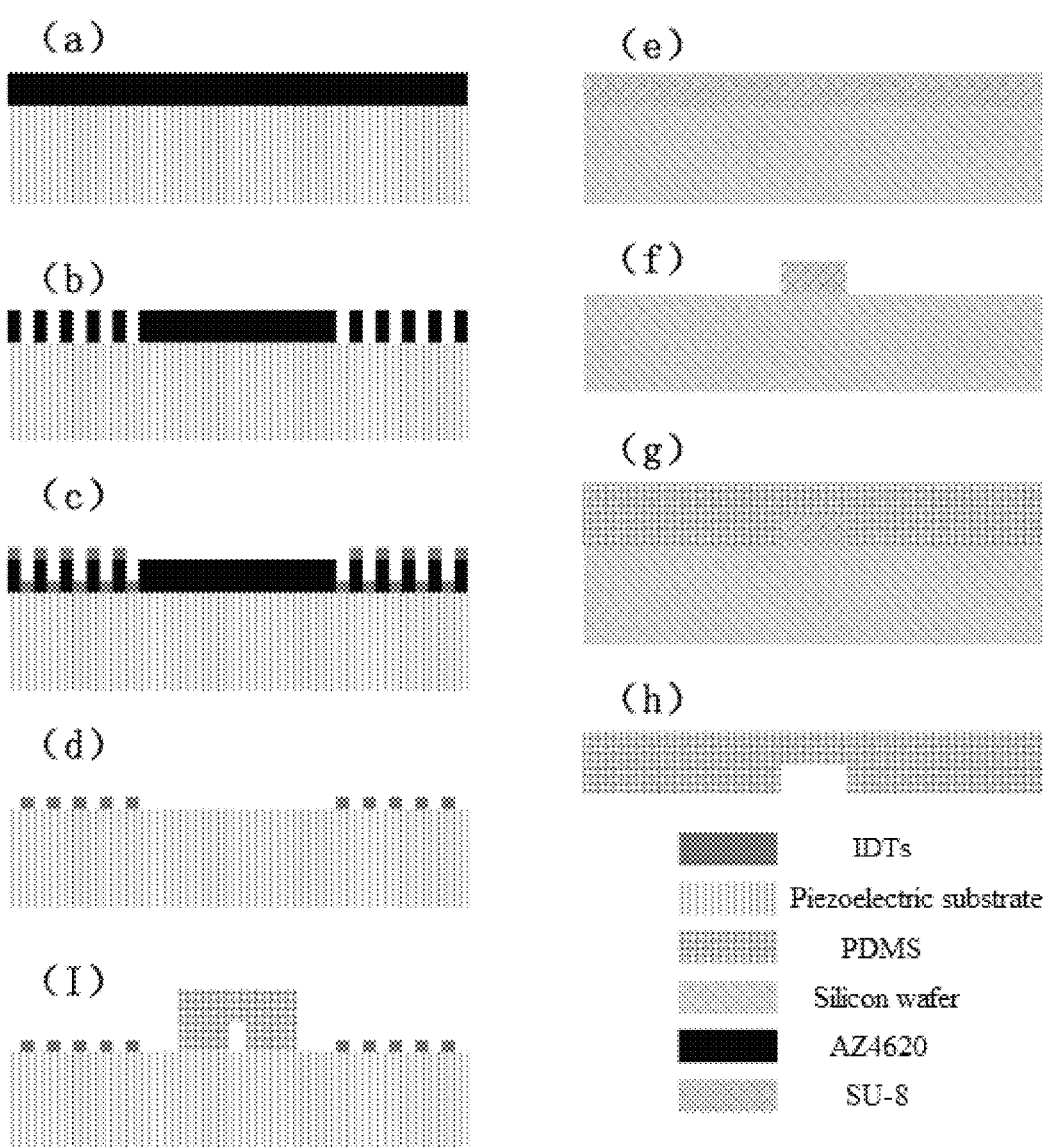
FIG. 4 is a schematic view of process of preparing an interdigital transducer provided by the embodiment 2 of the present application.

Specifically, a prepared film is then covered on top of aforesaid (a) in FIG. 4 for exposure. Patterned parts are opaque, unpatterned parts are transparent, and the parts where light passes through are cured. When developing with mif300, the cured parts are dissolved, while the uncured parts are not dissolved and are developed to form the pattern shown in (b) of FIG. 4.

S330, performing magnetron sputtering for the piezoelectric substrate after the exposure and development processing to grow a metal electrode layer or a photosensitive electrode layer on the surface thereof.

Specifically, magnetron sputtering is performed for the substrate that has finished pattern transferring, so that a metal electrode or photosensitive electrode layer with a thickness of about 200 nm grows thereon, as (c) of FIG. 4.

S340, peeling off the photoresist from the piezoelectric substrate on which the electrode layer grows to complete the preparation of the interdigital transducer.

Specifically, the substrate where the electrode grows is placed in acetone solution, and the photoresist is peeled off by ultrasonic vibration of an ultrasonic cleaning machine to complete the fabrication of the interdigital transducer, as (d) of FIG. 4.

Referring to FIG. 5, in the step of forming a PDMS channel on the interdigital transducer, the following steps S410-S440 are specifically included. Implementation manner of each step is described in detail below.

Step S410: performing pre-processing for the interdigital transducer.

Specifically, residual impurities on a surface of the interdigital transducer, such as dust, organic adsorbents, etc., are removed by methods such as acid washing, alcohol washing, water washing, etc., and finally the interdigital transducer is placed in a clean place to dry.

Step S420: coating negative photoresist on a surface of the pre-processed interdigital transducer and drying.

Specifically, a coating machine is used to spin-coat SU-8 (50) negative photoresist onto the surface of the pre-processed interdigital transducer, wherein the spin-coating parameters are as follows: 3000 rpm, 30 s, and a thickness of SU-8 (50) being approximately 50 μm; after coating, the interdigital transducer is placed horizontally on a 95° C. heating plate for 45 minutes to make solvent in the photoresist evaporate, so as to enhance an adhesion force between the photoresist and the interdigital transducer, thereby obtaining the pattern in (e) of FIG. 4.

S430: performing exposure and development processing for the dried interdigital transducer.

Specifically, a film with a pattern that has been made is placed on the interdigital transducer that has been spin-coated with photoresist, and the photoresist is exposed by an exposure machine, an exposure dose is 200 mJ/cm². After exposure, they are heated at 65° C. for 1 minute, and then heated at 95° C. for 3-5 minutes. The exposed interdigital transducer is soaked by developer solution, the photoresist in unexposed areas is dissolved, and the photoresist in exposed areas still retains, thereby obtaining the pattern in (f) of FIG. 4.

S440: fitting a PDMS channel and performing bonding processing on an upper surface of the interdigital transducer after the exposure and development processing.

In some embodiments thereof, the PDMS channel is obtained by preparation using the following method: injecting PDMS into a mold, vacuuming to remove bubbles from the PDMS, and then heating to solidify the PDMS; peeling off the PDMS from a channel of the mold to obtain the PDMS channel.

Specifically, A glue and B glue of PDMS are proportioned in a mass ratio of 10:1, mixed evenly, and placed into a mold. Bubbles in PDMS are removed by vacuuming, and finally the culture dish is placed in an 80° C. oven for 30 minutes to cure PDMS, as shown in (g) of FIG. 4; the PDMS channel is peeled off from the mold, as shown in (h) of FIG. 4.

Furthermore, the interdigital transducer and the PDMS channel that have been made are subjected to plasma prcoessing, the plasma processing has a power of 150 W and a duration of 70 seconds. Then the PDMS channel is fit onto the interdigital transducer to bond and baked in an 80° C. oven for 20 minutes. A fabricated interdigital transducer for experimental use, as shown in (I) of FIG. 4, is obtained.

Step S220: the cells arranged in a straight line flowing through a focused acoustic field generated by a second interdigital transducer, and the focused acoustic field generating a radiation force on the cells, such that the cells are deformed.

In some embodiments thereof, in the step of the cells arranged in a straight line flowing through a focused acoustic field generated by a second interdigital transducer, and the focused acoustic field generating a radiation force on the cells, such that the cells are deformed, deformation generated by the cells is recorded by a high-speed camera or a microscope.

Step S230: calculating, according to the radiation force and deformation information, to obtain elastic moduli of the cells.

In some embodiments thereof, in the step of calculating, according to the radiation force and deformation information, to obtain elastic moduli of the cells, the following steps S231-S233 are specifically included. Specific implementation manner of each step is described in detail below.

Step S231: obtaining information of deformation of the cells.

It can be understood that when cells flow through an acoustic field area, a low-intensity standing wave acoustic field is first used to arrange the cells at sound wave node positions, and then high-intensity focused standing wave ultrasound is used to act on the cells. At this time, directions of ultrasound radiation forces exerted on two ends of a cell membrane are opposite, thus compression is formed on the cell and causes deformation. A cell's deformation amount mainly depends on external forces and elastic modulus of the cell. External forces are the main factor in cell deformation and are directly proportional to the cell's deformation amount. As shown in FIG. 6, under action of an ultrasonic radiation force generated by a standing wave sound field, a cells is compressed from a spherical shape to an ellipsoidal shape. Based on image processing algorithms, a contour of the cell can be extracted and analyzed.

Step S232: performing simulation for the ultrasound radiation force exerted on the cells.

Specifically, based on measurement results of existing sound wave energy and information such as sound velocities and density of the cells, the ultrasound radiation force exerted on the cells is simulated.

It can be understood that in order to obtain the ultrasonic radiation force exerted on the cells, it is necessary to characterize information of the acoustic field where the cells are located, and then apply the theory of acoustic radiation stress tensor for calculation. An incident standing wave sound field can be expressed as:

$$p_{in} = p_a \sin(k_o y) e^{-i\omega t}$$

wherein $p_a$ is an amplitude of a sound pressure, $k_o$ is a beam in an external medium, $\omega = 2\pi f$ is an angular frequency, and f is an ultrasonic frequency. A sound wave propagation equation of a sound pressure $p_1$ in a liquid medium inside and outside the cells is a Helmholtz equation:

$$\Delta p_1 - \frac{1}{c^2} \frac{\partial^2 p_1}{\partial t^2} = 0$$

wherein $\Delta$ is the Laplace operator, c is a speed of sound in the medium, and velocities of ultrasonic particles can be expressed using the Euler formula as follows:

$$v_1 = -\frac{1}{i\omega\rho} \nabla p_1$$

wherein $\rho$ is a density of the medium. Based on the above ultrasound acoustic field information, a ultrasound radiation stress tensor (T) can be obtained:

$$\langle T \rangle = \left( \frac{\langle p_1^2 \rangle}{2\rho c^2} - \frac{\rho \langle v_1 \cdot v_1 \rangle}{2} \right) i + \rho \langle v_1 \otimes v_1 \rangle$$

wherein i represents an average tensor in a two-dimensional space, and <·> represents a time average within a sound wave period.

S233: realizing characterization of elastic moduli of the cells based on a simulation result.

It can be understood that after obtaining information of the deformation of the cells and of the forces exerted on the cells, it is necessary to build force, cell deformation, and elastic modulus models to calculate elastic moduli of cells.

In order to simulate in-plane elasticity of cell membranes, the neo-Hookean law is commonly used, and an actual tensile force exerted on a three-dimensional cell in a plane can be described using a two-dimensional model of the cell. In this case, an elastic modulus formula derived from the neo-Hookean law is:

$$E_s = \frac{T}{\left( \lambda^{3/2} - \lambda^{-3/2} \right)}$$

wherein $E_s$ represents an elastic modulus of a cell membrane, and $\lambda = ds/ds_0$ represents bending and stretching of the cell membrane. $ds_0$ and ds respectively represent infinitely small inline units of the cell membrane before and after deformation.

Through above steps S231-S233, calculation according to the radiation forces and the information of the deformation can be completed, so as to obtain the elastic moduli of the cells.

Step S240: selectively driving third interdigital transducers with designed delay time according to moving speeds of the cells and distances between the cells and a sorting unit.

In this embodiment, the present application determines positions of the cells by designing a cell locating unit (e.g., the cell locating unit 140), and according to moving speeds of the cells and distances between the cells and a sorting unit (e.g., the cell sorting unit 150), selectively driving third interdigital transducers (e.g., the third interdigital transducer 151) in a cell sorting unit (e.g., the cell sorting unit 150) with designed delay time.

Step S250: according to the elastic moduli, triggering a corresponding third interdigital transducer to generate a planar acoustic field to sort the cells.

It can be understood that when it is necessary to sort out soft cells, the cell elastic modulus calculation unit 130 calculates, according to the radiation force and the deformation information, to obtain the elastic moduli of the cells. The cell sorting unit 150 triggers, according to the elastic moduli, a planar ultrasonic transducer, such as the third interdigital transducer 151, to generate sound waves, and a radiation force generated by the sound waves will push the soft cells towards an upper end of a channel; on the contrary, when hard cells flow through, the cell sorting unit 150, according to the elastic moduli, will not trigger the corresponding third interdigital transducer 151, and the hard cells still flow in the original direction, thereby achieving cell sorting based on cell elasticity.

The cellular mechanical property measurement and sorting method provided by the present application realizes measurement and sorting for cellular elasticity by means of an ultrasound and non-contact manner, thereby reducing damage to cells.

Embodiment 3

Figure 7:
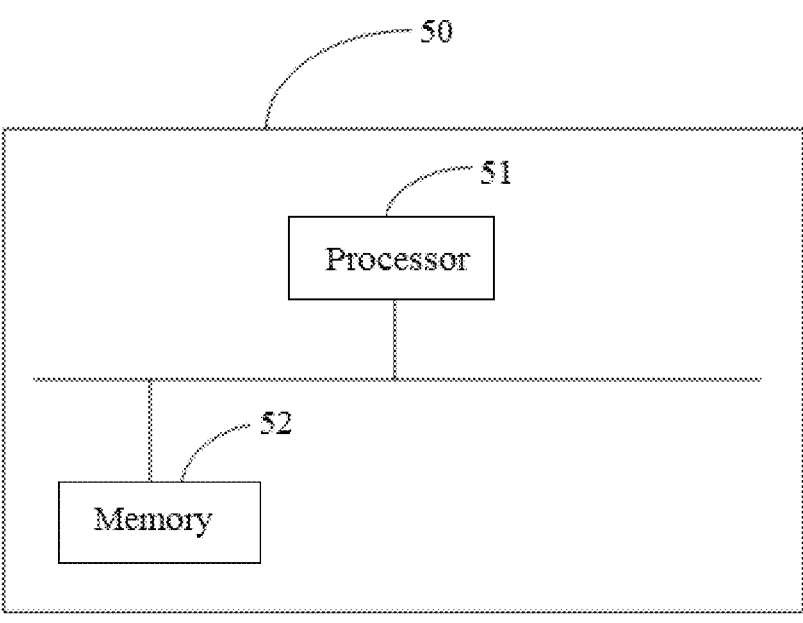
FIG. 7 is a structural schematic diagram of a terminal provided by an embodiment 3 of the present application.

Referring to FIG. 7, which is a structural schematic diagram of a terminal of an embodiment 3 of the present application. The terminal 50 includes a processor 51 and a memory 52 coupled with the processor 51.

The memory 52 stores program instructions used to implement above cellular mechanical property measurement and sorting method.

The processor 51 is used to execute the program instructions stored in the memory 52 to control cell sorting.

Among them, the processor 51 can also be referred to as a CPU (Central Processing Unit). The processor 51 may be an integrated circuit chip with signal processing capabilities. The processor 51 can also be a general-purpose processor, a digital signal processor (DSP), an application specific integrated circuit (ASIC), a field programmable gate array (FPGA), or other programmable logic devices, discrete gates or transistor logic devices, or discrete hardware components. The general-purpose processor may be a microprocessor, or the general-purpose prcoessor can also be any conventional processor.

Embodiment 4

Figure 8:
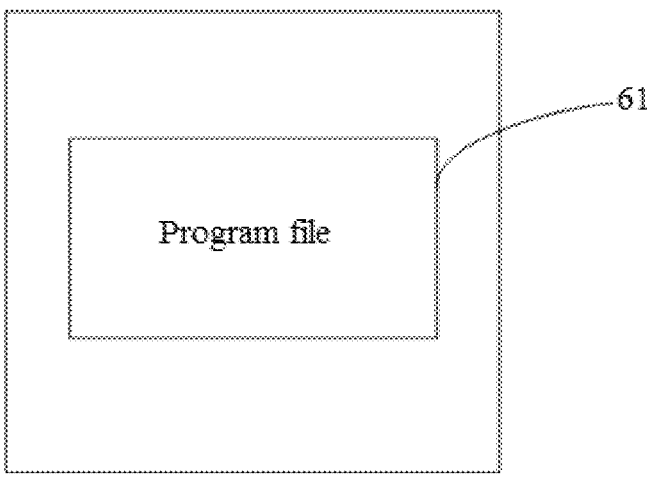
FIG. 8 is a structural schematic diagram of a storage medium provided by an embodiment 4 of the present application.

Referring to FIG. 8, which is a structural schematic diagram of a storage medium of an embodiment 4 of the present application. The storage medium of this embodiment of the present application stores a program file 61 that can implement all of the above methods, wherein the program file 61 can be stored in the storage medium in the form of a software product, and includes multiple instructions used to make a computer device (which may be a personal computer, a server, or a network device, etc.) or a processor to execute all or some steps of the methods of the embodiments of the present application. The aforementioned storage medium includes: various other media that can store program codes, such as USB flash drives, portable hard drives, read-only memories (ROM), random access memories (RAM), magnetic disks or optical disks, and so on, or terminal devices such as computers, servers, mobile phones, tablets, etc.

It can be understood that the various technical features of the above described embodiments can be combined arbitrarily. In order to make the description be concise, all possible combinations of the various technical feature in the above embodiments have not been described. However, as long as there is no contradiction in the combination of these technical features, they should be all considered as being within the scope of this specification.

The above are only preferred embodiments of the present application and only specifically describe the technical principles of the present application. These descriptions are only intended to explain the principles of the present application and cannot be interpreted in any way as limiting the protection scope of the present application. Based on this explanation, any modification, equivalent replacement, and improvement made within the spirit and principles of the present application, as well as other specific implementations of the present application that can be associated without the need for paying creative labor by technical personnel in this field, shall be all included in the protection scope of the present application.

What is claimed is:

1. A cellular mechanical property measurement and sorting system comprising a first interdigital transducer, a second interdigital transducer, a cellular elastic modulus calculation unit, a cell locating unit, and a cell sorting unit comprising a plurality of third interdigital transducers; wherein the first interdigital transducer is configured to generate a standing wave acoustic field, which arranges cells to be sorted in a straight line;

the second interdigital transducer is configured to generate focused acoustic field, which generates a radiation force on the cells arranged in a straight line, such that the cells are deformed;

the cellular elastic modulus calculation unit comprises a recording module and a computer, the recording module comprises a high-speed camera or a microscope, the recording module is configured to record deformation generated by the cells, the computer is configured to calculate, according to the radiation force and deformation information, to obtain elastic moduli of the cells; wherein the high-speed camera has a frame rate sufficient to record deformation of the cells;

the cell locating unit comprises a photosensitive electrode, the photosensitive electrode is configured to determine positions of the cells;

the cell sorting unit comprises a plurality of third interdigital transducers;

wherein the system is configured to: selectively drive the third interdigital transducers in the cell sorting unit with designed delay time according to moving speeds of the cells and distances between the cells and the cell sorting unit; and trigger, according to the elastic moduli, a corresponding third interdigital transducer to generate a planar acoustic field to sort the cells;

wherein the first interdigital transducer, the second interdigital transducer, and the plurality of third interdigital transducers are arranged in series along a microfluidic channel; and wherein the system is configured to perform calculation of the elastic moduli and trigger the corresponding third interdigital transducer in real-time as each cell flows from the second interdigital transducer to the cell sorting unit.

2. A cellular mechanical property measurement and sorting method, applied on a system, the system comprising a first interdigital transducer, a second interdigital transducer, and a plurality of third interdigital transducers being arranged in series along a microfluidic channel; the method comprises following steps:

arranging cells to be sorted in a straight line by a standing wave acoustic field generated by the first interdigital transducer;

generating a radiation force on the cells arranged in a straight line by a focused acoustic field generated by the second interdigital transducer, such that the cells are deformed;

calculating, according to the radiation force and deformation information, to obtain elastic moduli of the cells;

selectively driving the third interdigital transducers with designed delay time according to moving speeds of the cells and distances between the cells and a cell sorting unit;

according to the elastic moduli, triggering a corresponding third interdigital transducer to generate a planar acoustic field to sort the cells;

wherein performing calculation of the elastic moduli and trigger the corresponding third interdigital transducer in real-time as each cell flows from the second interdigital transducer to the cell sorting unit.

3. The cellular mechanical property measurement and sorting method according to claim 2, further comprising: obtaining any one of the first interdigital transducer, the second interdigital transducer, and the third interdigital transducer by preparing an interdigital transducer and forming a PDMS channel on the interdigital transducer.

4. The cellular mechanical property measurement and sorting method according to claim 3, wherein the preparing an interdigital transducer comprises:

coating positive photoresist on a surface of a piezoelectric substrate;

performing exposure and development processing for the piezoelectric substrate coated with positive photoresist;

performing magnetron sputtering for the piezoelectric substrate after the exposure and development processing to grow a metal electrode layer or a photosensitive electrode layer on the surface thereof;

peeling off the photoresist from the piezoelectric substrate on which the electrode layer grows to complete the preparation of the interdigital transducer.

5. The cellular mechanical property measurement and sorting method according to claim 3, wherein the forming a PDMS channel on the interdigital transducer comprises:

performing pre-processing for the interdigital transducer;

coating negative photoresist on a surface of the pre-processed interdigital transducer and drying;

performing exposure and development processing for the dried interdigital transducer;

fitting a PDMS channel and performing bonding processing on an upper surface of the interdigital transducer after the exposure and development processing.

6. The cellular mechanical property measurement and sorting method according to claim 5, further comprising obtaining the PDMS channel by the following operations:

injecting PDMS into a mold, vacuuming to remove bubbles from the PDMS, and then heating to solidify the PDMS; peeling off the PDMS from a channel of the mold to obtain the PDMS channel.

7. The cellular mechanical property measurement and sorting method according to claim 2, further comprising: recording deformation generated by the cells by a high-speed camera or a microscope; wherein the high-speed camera has a frame rate sufficient to record deformation of the cells.

8. The cellular mechanical property measurement and sorting method according to claim 2, wherein the calculating, according to the radiation force and deformation information, to obtain elastic moduli of the cells comprises:

obtaining information of deformation of the cells;

performing simulation for the ultrasound radiation force exerted on the cells;

realizing characterization of elastic moduli of the cells based on a simulation result.

9. A terminal, wherein the terminal comprises a processor and a memory coupled with the processor, wherein the memory stores program instructions configured to implement the cellular mechanical property measurement and sorting method according to claim 2; the processor is configured to execute the program instructions stored in the memory to control cell sorting.

\* \* \* \* \*